United States Patent [19]

Works et al.

[11] Patent Number: 5,016,898
[45] Date of Patent: May 21, 1991

[54] FIFTH WHEEL TRAILER HITCH ASSEMBLY FOR PICKUP TRUCKS AND FLAT BED VEHICLES

[76] Inventors: Joseph W. Works, R.R. #1 Box 165; Roger D. Baker, 915 N. 7th, both of Humboldt, Kans. 66748

[21] Appl. No.: 520,409

[22] Filed: May 8, 1990

[51] Int. Cl.$^5$ .................... B62D 53/06; B60D 1/52; B60D 1/06
[52] U.S. Cl. ................... 280/433; 280/491.5; 280/511; 280/901
[58] Field of Search .............. 280/415.1, 423.1, 433, 280/438.1, 491.1, 491.5, 504, 511, 901

[56] References Cited

U.S. PATENT DOCUMENTS

| 2,877,025 | 3/1959 | Jay | 280/495 |
| 3,893,713 | 7/1975 | Ivy | 280/511 |
| 4,256,324 | 3/1981 | Hamilton | 280/511 |
| 4,540,194 | 9/1985 | Dane | 280/415.1 X |
| 4,546,994 | 10/1985 | Taylor | 280/511 |
| 4,570,966 | 2/1986 | Giboney et al. | 280/511 |
| 4,657,274 | 4/1987 | Mann et al. | 280/433 |

FOREIGN PATENT DOCUMENTS 3328524 2/1985 Fed. Rep. of Germany ...... 280/511

Primary Examiner—Charles A. Marmor
Assistant Examiner—Kevin Hurley
Attorney, Agent, or Firm—Dowell & Dowell

[57] ABSTRACT

A trailer hitch assembly which includes a hitch ball which is selectively positioned within a retention sleeve mounted below and through the cargo bed of a vehicle and which further includes a locking pin which secures the hitch ball either in a first upright position within the sleeve wherein the ball is elevated with respect to the cargo bed or in an inverted position wherein the base of the hitch ball is mounted flush with the cargo bed.

7 Claims, 2 Drawing Sheets

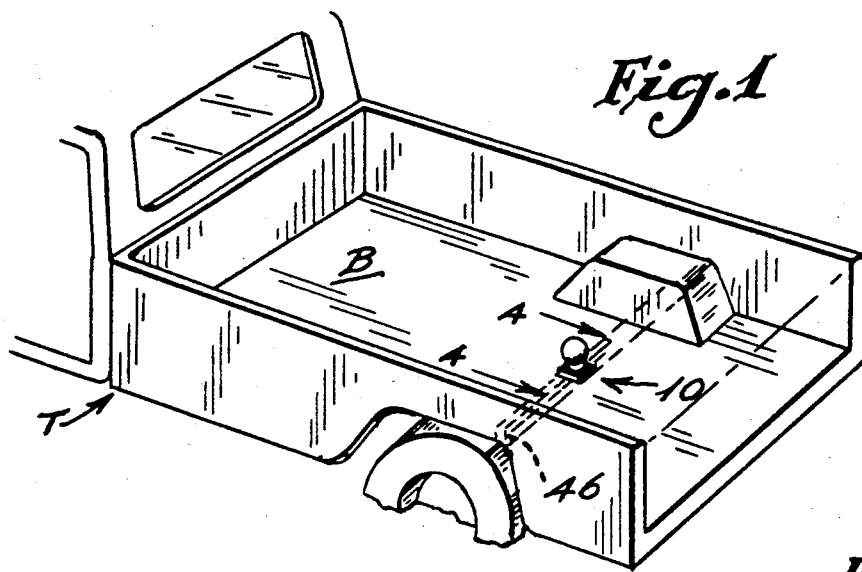
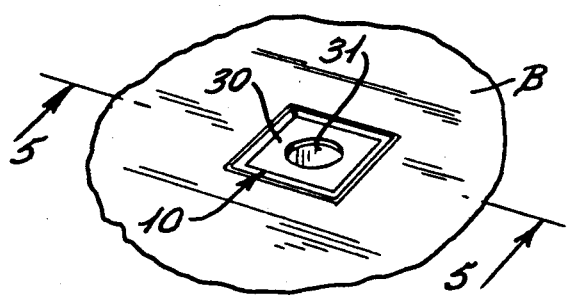
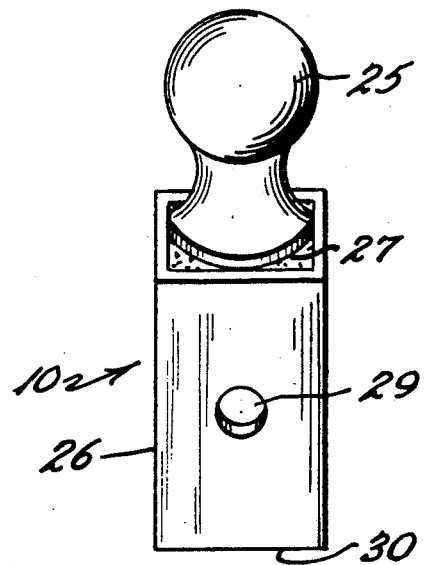
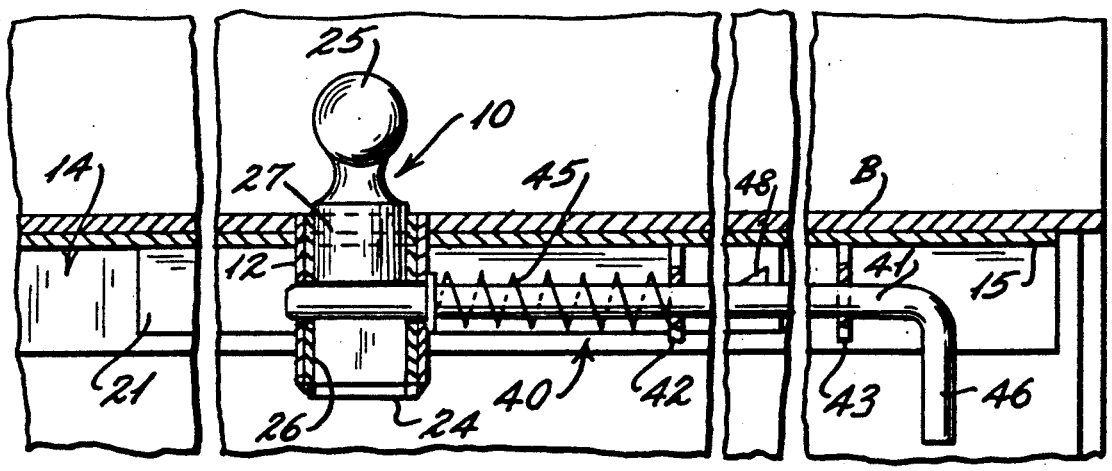

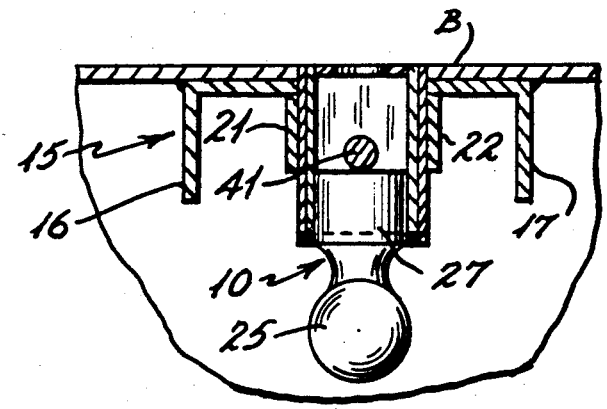
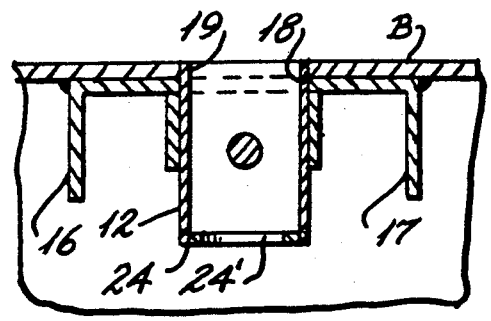
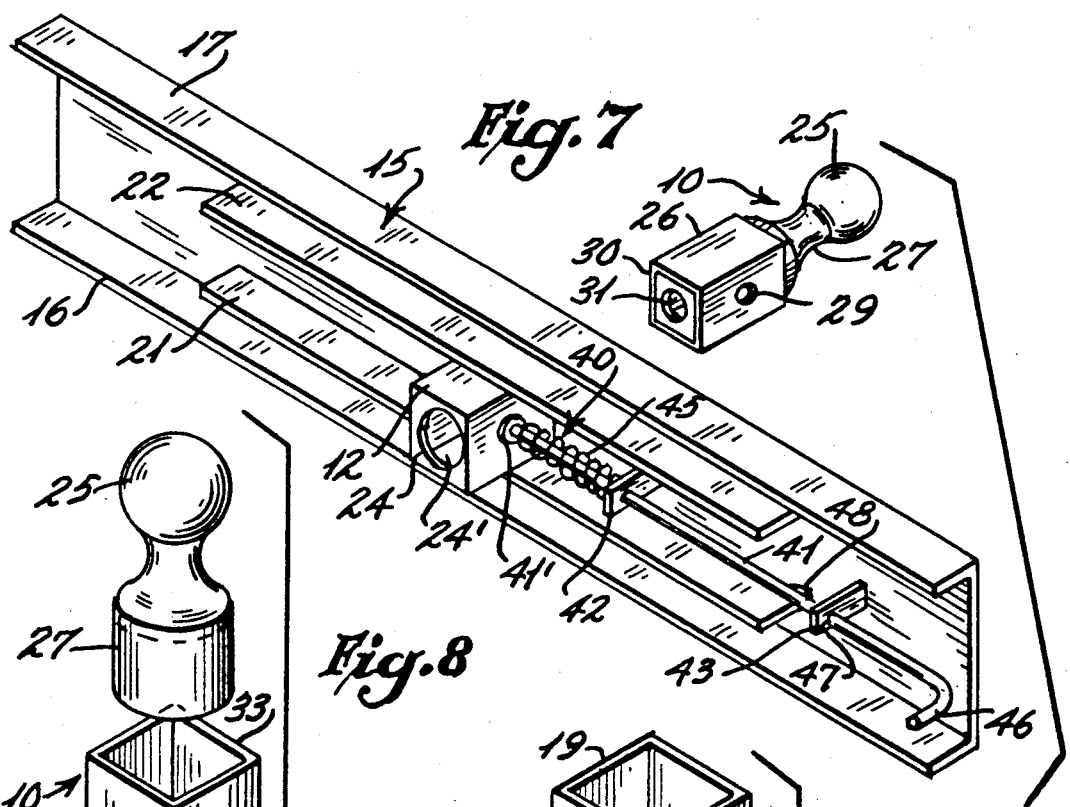
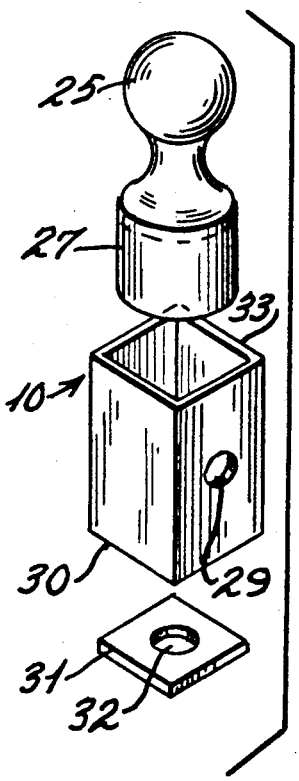
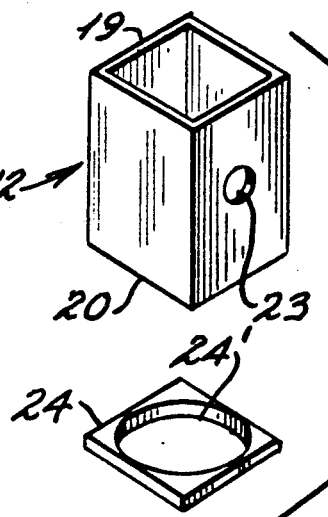

FIFTH WHEEL TRAILER HITCH ASSEMBLY FOR PICKUP TRUCKS AND FLAT BED VEHICLES

BACKGROUND OF THE INVENTION

1. Field of the Invention

This invention is generally directed to trailer hitches for vehicles and more specifically to fifth wheel trailer hitches utilized on the cargo beds of vehicles and particularly conventional pickup truck beds. The fifth wheel trailer hitch assemblies of the present invention include a hitch ball which is mounted to a base that is selectively secured within a sleeve which is mounted so as to extend through the bed of the vehicle with the sleeve being reinforced by supports which are secured beneath the bed of the vehicle. The base portion of the hitch ball includes side openings therethrough which are selectively aligned with side openings through the sleeve member so that a locking pin may be selectively aligned and extended therethrough to thereby secure the hitch ball in fixed relationship with respect to the retention sleeve so that the hitch ball extends above the bed of the vehicle. The locking pin may be selectively manually withdrawn from engagement with the base portion of the hitch ball and the retention sleeve to permit the removal of the hitch ball so that the hitch ball may be raised and inverted and re-inserted within the sleeve member The sleeve member includes a lower wall which includes an enlarged opening therein which permits the passage of the hitch ball when inserted in the inverted position. When the side openings through the base portion of the hitch ball and the sleeve member are appropriately aligned, the locking pin may be re-inserted therethrough thereby locking the hitch ball in an inverted position wherein the lowermost surface of the base thereof is substantially flush with the cargo bed of the vehicle so that the cargo bed may be utilized in a conventional manner without any interference or obstruction by the hitch assembly.

2. History of the Related Art

Conventional trailer hitches for light weight automobile and truck type vehicles normally include a hitch plate or bar which is welded adjacent the rear bumper of the vehicle or on the rear bumper of the vehicle and to which a hitch ball may be selectively secured. There are a number of conventional sizes of hitch balls which may be utilized depending upon the hitch assembly which is incorporated with the trailer that is to be towed. One shortcoming in such conventional rear end hitch assemblies is that the amount of weight which may be pulled by the vehicle is limited as the weight or force placed on the hitch assembly is at a point which is spaced from the rear axle of the vehicle. With this type of assembly, an increased moment of force is enduced about the rear axle thereby limiting the load which may be safely pulled by the vehicle without adversely effecting the weight distribution to the front wheels of the vehicle.

In order to overcome the foregoing problem, a system for mounting trailer hitches was developed which has been referred to as a "fifth wheel" type trailer hitch. The fifth wheel trailer hitch includes a hitch ball which is mounted over or slightly forwardly of the rear axle of a flat bed type vehicle and particularly pickup trucks. By positioning the hitch ball above or forwardly of the rear axle of the vehicle, the weight which the vehicle can tow is significantly increased over vehicles having the rear end type hitch assemblies. In order to allow the trailing vehicle to be connected to a fifth wheel type hitch, a "gooseneck" type extension is utilized on the towing arm of the trailing vehicle. The gooseneck is generally somewhat curved with the hitch portion being disposed at the forward end thereof and with the central portion thereof extending upwardly and over the rear of the pulling vehicle.

Although the fifth wheel trailer hitch assemblies provide the added advantage of allowing a vehicle to safely tow a greater weight load, the placement of the trailer hitch ball along the cargo bed of the towing vehicle adversely effected the normal use of the cargo bed when the vehicle is not being utilized to pull a trailer. In order to overcome this disadvantage, there have been a number of structures developed for allowing the trailer hitch ball to be either selectively removed or retracted from its use position relative to the cargo bed of the towing vehicle.

In U.S. Pat. No. 4,546,994 to Taylor, a universal trailer hitch of the fifth wheel type is disclosed which includes a reinforcing frame which is mounted beneath the cargo bed of the towing vehicle. The frame supports a reinforcing bed plate to which is secured a trailer hitch support sleeve which extends vertically therefrom. The support sleeve is open so as to selectively receive the base or post of a trailer hitch ball that may be selectively positioned therein so that the hitch ball is elevated with respect to the cargo bed of the towing vehicle. The size of the hitch ball may be selectively altered by utilizing different sizes of ball elements with the hitch assemblies. When the hitch ball is in use, a locking mechanism is provided which includes a pin member which is selectively extendable through the hitch support sleeve and the post of the hitch ball assembly. When the hitch ball is not in use, it is selectively removed from the support sleeve and stored in a remote location. This leaves the opening in the support sleeve exposed through the bed of the vehicle and also requires that the hitch ball assembly be placed in another location in the vehicle or stored in a place remote from the vehicle when not in use.

Due to the inconvenience which is associated with having to remotely store a hitch ball assembly when not in use, other fifth wheel trailer hitch assemblies have been developed wherein the hitch ball is mounted so as to be retained beneath the cargo bed of the vehicle when not in use. In U.S. Pat. No. 4,657,274 to Mann, et al, a retractable king pin assembly or hitch assembly for the bed of a vehicle is disclosed which incorporates a king pin or hitch ball which is mounted on an elongated shaft which is provided with a vertical rack assembly having teeth which are selectively engageable with a gear that may be manually rotatably operable so as to extend or retract the hitch ball vertically relative to the cargo bed of the vehicle. When the hitch ball is in a fully retracted position with respect to a guide sleeve through which the gear extends so as to contact the vertical rack assembly associated with the hitch pin, a pair of plate members are hingedly connected to the vehicle bed and are moveable into a flat configuration covering the opening in the area of the hitch assembly.

In U.S. Pat. No. 4,570,966 to Giboney, et al, a retractable trailer hitch ball assembly is disclosed which includes a housing which is mounted beneath the vehicle load bed and which incorporates a hitch ball element that is selectively extended through an opening in the housing upwardly through an opening in the bed of the vehicle. The hitch ball is extended by operation of a hydraulic cylinder which is operable from controls disposed in the cab of the vehicle. The hitch ball is carried by a pivotable plate which is normally urged into a retracted position so that the hitch ball is moved inwardly of the housing when not in use. The pivotable plate assembly is operable by the hydraulic cylinder arm which acts to urge the plate upwardly relative to the vehicle bed to thereby extend the hitch ball to a use position. Another retractable fifth wheel trailer hitch assembly is disclosed in U.S. Pat. No. 4,256,324 to Hamilton. In this patent, the trailer hitch ball is pivotably mounted to a housing which is installed through an opening in the load bed of the vehicle. The housing further incorporates a second pivotable plate member which forms an extended portion of the vehicle load bed when the ball is in a use position and which is pivotable upwardly relative to the hitch ball so as to allow the hitch ball to rotate about its mounting axis to a position beneath the bed of the vehicle. The side portion of the base of the hitch ball forms a portion of the continuous surface of the load bed when the hitch ball is pivoted to an out of use position.

Such prior art retractable fifth wheel assemblies all require substantial mechanical structure to permit the retraction of the hitch ball to a non-use position wherein the cargo bed of the vehicle may be utilized in a conventional manner. Such structures are mechanically complex and not only increase the cost of the fifth wheel assemblies but also are structures which may be accidentally manipulated when the hitch ball is supposed to be in a use position so that the hitch ball may be accidentally released from its vertically elevated position thereby potentially presenting a situation where the hitch ball is not fixedly secured to its mounting assembly at a point in time when a load is being placed thereon. Such a situation could lead to a shifting of the load with respect to the towing vehicle thereby causing a potentially hazardous situation which could lead to injury of the operator of the vehicle or another vehicle passing in close proximity to either the towing or trailing vehicle. For instance, in the structure disclosed in Gibbany, et al, an accidental displacement or failure of the hydraulic system would lead to the automatic release of the hitch ball under the influence of the spring associated with the support assembly for the hitch ball. In the reference to Mann, et al, the inadvertent operation of the crank assembly which operates the gear mechanism could also lead to the retraction of the hitch ball at a point in time when the hitch ball is supposed to be locked in its extended use position. In the patent to Hamilton, if a load were to encounter the pivotable plate which retains the hitch ball in position while the hitch ball is in use, the hitch ball could swing toward a retracted position thereby shifting the load associated with the trailer with respect to the hitch ball assembly.

In view of the foregoing, it is necessary to provide a fifth wheel trailer hitch assembly for use with vehicles having flat cargo beds wherein the hitch ball may be safely secured in a vertical use position when a trailing vehicle is connected thereto but which also permits the hitch ball to be retained with the vehicle in an out of use position in such a manner that the load bed of the vehicle may be utilized in its conventional manner.

SUMMARY OF THE INVENTION

A fifth wheel trailer hitch assembly for pickup trucks and flat bed vehicles which includes a hitch ball which is mounted to a base which base is selectively receivable within a retention sleeve member secured to the lower portion of the vehicle load bed and which extends through an opening formed in the vehicle load bed. The sleeve member is supported by reinforcing elements secured beneath the vehicle load bed. The sleeve member and the base portion for the hitch ball include a pair of side openings therethrough which may be selectively aligned with one another when the base portion of the hitch ball is inserted within the sleeve so that a locking pin assembly may be extended through the aligned openings to secure the hitch ball relative to the sleeve so that the hitch ball extends upwardly relative to the cargo bed of the vehicle in a use position. The lowermost portion of the retention sleeve member of the hitch assembly includes a plate having an enlarged opening therethrough which is just slightly greater in diameter than the diameter of the ball of the hitch so that when the hitch ball is to be placed in a non-use position, the locking pin may be pulled from the aligned side openings in the base portion of the hitch ball and the sleeve member thereby releasing the hitch ball so that the hitch ball may be lifted from the sleeve member, inverted and placed upside down within the sleeve member so that the ball of the hitch extends through the opening in the base portion of the sleeve member. Thereafter, the locking pin may be aligned with the side openings through the sleeve member and the base portion of the hitch ball so as to lock the hitch ball in an inverted position relative to the sleeve assembly which position is the non-use position. The dimensions of the base portion of the hitch ball and of the sleeve member are such that the bottom of the base portion of the hitch ball will extend substantially flush with the load or cargo bed of the vehicle when the hitch ball is in a non-use position.

In order to assist in removing the hitch ball from the sleeve member in order to re-install the hitch ball in a use position, a small opening is provided in the end of the base portion which can be engaged either by a tool or by an individual's finger to thereby allow the hitch ball to be raised from the sleeve member when the locking pin is withdrawn from the aligned side openings in the sleeve member and the base portion of the hitch ball.

It is a primary object of the present invention to provide a fifth wheel trailer hitch assembly for the cargo bed of pickup trucks and flat bed vehicles which allows the hitch ball to be conveniently and readily stored within its mounting sleeve in an inverted relationship with respect thereto when not in use so that the base portion of the hitch ball forms a substantially continuous surface with the bed of the vehicle thereby allowing the vehicle to be used in a conventional manner when the hitch ball is not in use.

It is a further object of the present invention to provide a fifth wheel trailer hitch assembly for use with flat bed vehicles wherein the hitch assembly requires only minor modification to be made to the vehicle so that the structural integrity of the vehicle bed is not adversely effected by the installation of the hitch assembly.

It is yet another object of the present invention to provide a fifth wheel trailer hitch assembly for use with flat bed vehicles which does not include any operable components which may be accidentally engaged while the hitch assembly is in use to allow the release of the hitch ball thereby insuring that the load secured to the hitch ball is secured at all times relative to the load bed of the vehicle.

It is also an object of the present invention to provide a fifth wheel trailer hitch assembly which utilizes few mechanical moving parts and thereby provides not only an uncomplicated structure which provides a high strength trailer hitch assembly but one in which the cost of the assembly is reduced over those of prior art trailer hitch assemblies.

It is also an object of the present invention to provide a fifth wheel trailer hitch assembly wherein the size of the trailer hitch ball may be easily changed so as to accomodate trailer hitches of varying conventional sizes.

BRIEF DESCRIPTION OF THE DRAWINGS

FIG. 1 is an illustrational view showing the hitch ball portion of the fifth wheel trailer hitch assembly of the present invention as being mounted relative to the load bed of a vehicle such as a conventional pickup truck.

FIG. 2 is an enlarged illustrational view showing the hitch ball portion of the fifth wheel trailer hitch assembly of the present invention in an inverted position installed in the load bed of the vehicle shown in FIG. 1.

FIG. 3 is a side perspective view of the hitch ball of the present invention.

FIG. 4 is an enlarged cross sectional view taken along lines 4—4 of FIG. 1 showing the locking pin in a locked position.

FIG. 5 is a cross sectional view taken along lines 5—5 of FIG. 2.

FIG. 6 is a cross sectional illustrational view taken along the lines 5—5 of FIG. 2 with the hitch ball removed from the retention sleeve.

FIG. 7 is an assembly view of the fifth wheel trailer hitch assembly of the present invention showing the mounting supports for the retention sleeve and the hitch ball.

FIG. 8 is an assembly view of the hitch ball of the present invention.

FIG. 9 is an assembly view of the retention sleeve of the present invention.

DESCRIPTION OF THE PREFERRED EMBODIMENT

With continued reference to the drawings, the fifth wheel trailer hitch assembly of the present invention is shown as being installed through the load bed B of a conventional vehicle such as a pickup truck T. As shown in FIG. 1, the assembly is designed so that the hitch ball 10 is mounted either over the rear axles A of the vehicle or slightly forwardly thereof. Although the invention will be described as being installed generally in line with the elongated axis of the vehicle the present trailer hitch assembly may be installed from side to side if preferred so as to be generally parallel with the axle A thereof. In addition, although the load bed is shown in FIG. 1 as being generally planar or flat, in many instances, the load bed may be corrugated and the trailer hitch assembly is designed to cooperate with the corrugations of a vehicle load bed so as to not alter the overall configuration of the load bed when the hitch ball is inverted in non-use position as will be discussed in greater detail hereinafter. With specific reference to FIGS. 4 and 7 of the drawings, the fifth wheel of the trailer hitch assembly of the present invention includes the trailer hitch ball 10 which is selectively receivable within a retention sleeve 12 which is mounted through an opening which is provided or made through the load bed of the vehicle. The opening is generally oriented between the side walls of the vehicle so as to be located along the elongated axis of the vehicle and is spaced as previously discussed either slightly forwardly or above the rear axle A of the vehicle.

In order to stabilize the retention sleeve relative to the opening in the load bed of the vehicle, a reinforcing frame 14 is provided and is bolted, welded or otherwise secured to the frame members of the vehicle.

Reinforcing frame 14 includes a generally U-shaped beam member 15 having a pair of spaced elongated flange portions 16 and 17. An opening 18 is provided intermediate the flanges 16 and 17 and generally centrally of the length of the beam 15. The opening 18 is of the same size as the opening in the vehicle load bed and the frame 14 is secured to the under side of the load bed so that the opening 18 is in alignment with the opening in the load bed.

The retention sleeve 12 is shown as being a generally open box channel member having an upper end 19 and lower end 20. The size of the box channel member is generally just slightly larger than the maximum size of the hitch ball 10 as will be discussed in greater detail hereinafter.

The upper end 19 of the retention sleeve is positioned within the opening 18 so as to be substantially flush with the load bed B of the vehicle and is secured in this relationship by providing a pair of structural bar elements 21 and 22 which extend on either side thereof. The elements 21 and 22 are welded to the sides of the retention sleeve member with the elements extending generally parallel with the side flanges 16 and 17 of the beam element 15. Each of the elements 21 and 22 is likewise welded or otherwise secured to the beam element 15.

With specific reference to FIG. 9, the retention sleeve 12 includes a pair of spaced openings 23 which are provided in the side walls thereof spaced from the structural elements 21 and 22. In addition, the lower open end 20 of the sleeve member is partially closed by a plate member 24 which has an enlarged opening 24' provided therethrough which is of a diameter which is just slightly greater than the diameter of the ball 25 of the hitch ball 10 so that the ball may be selectively received therethrough. The plate 24 is provided so as to insure that the generally square base portion 26 of the hitch ball will be selectively seated therewith when the hitch ball 10 is in a use position as is shown in FIG. 1 and FIG. 4 of the drawings. The plate 24 will insure that the base 26 of the hitch ball will be properly aligned within the retention sleeve 12 whenever the hitch ball is placed therein regardless of whether the hitch ball is in a use position or an inverted position.

With particular reference to FIGS. 5, 7 and 8, the hitch ball will be described in greater detail. As previously noted, the hitch ball includes the ball element 25 which is generally a steel ball connected by an integral neck to a cylindrical stem 27. The cylindrical stem is welded within the base 26. As shown, the base 26 is constructed of a generally square steel tubing. A pair of openings 29 are provided through opposite side walls of the steel tubing and are of the same size as the openings 23 within the side walls of the retention sleeve. The lowermost portion 30 of the base 26 of the hitch ball is partially closed by a plate element 31 which is welded therein. A small opening 32 is provided generally centrally of the plate element 31 so as to allow a finger or a tool to be inserted through the plate 31 to lift the hitch ball from the retention sleeve when the hitch ball is installed in inverted relationship as is shown in FIG. 5. The dimensions of the base 26 of the hitch ball are just slightly less than the dimensions of the steel retention sleeve so that the base 26 may be slideably received within the retention sleeve as is shown in FIGS. 4 and 5. Generally, the stem 27 of the hitch ball is positioned slightly above the openings 29 through the side walls of the base portion thereof. The openings 29 are positioned so that when the hitch ball is fully seated within the retention sleeve with the ball 25 either being disposed upwardly relative to the load bed as shown in FIG. 4 or below the load bed as shown in FIG. 5, the openings 29 will align with the openings 23. The proper alignment is insured as the square upper edges 33 of the base 26 of the hitch ball or the square lower edges thereof as shown at 30 will engage with the edges of the plate 24 which close the periphery of the lower portion 20 of the retention sleeve.

In order to insure that the hitch ball is locked in an assembled position within the retention sleeve, a locking assembly 40 is provided. The lock assembly includes an enlongated rod 41 which is mounted through a pair of guide members 42 and 43 so as to be in alignment with the openings 23 in the retention sleeve. Each of the alignment members are welded or otherwise secured to the beam element 15 of the reinforcing frame.

The locking rod 41 is resiliently urged towards seated engagement with the opening 23 by a spring element 45 which is positioned intermediate a flange 41' formed along the rod and and guide element 42. The outer end 46 of the locking rod is curved so as to provide an easily manipulable handle. In order to secure the locking rod in a released position with regard to the openings 23 in the retention sleeve, a latch member is provided which is operable when the locking rod is in a withdrawn position. As one type of latching mechanism, an irregularly shaped opening 47 may be provided through the guide element 43 through which a retention stud 48 provided along the locking rod may selectively pass. Once the stud 48 has passed through the opening 47, the rod may be rotated 90° to thereby lock the locking rod against the guide element 43 and prevent the re-insertion of the locking rod until such time as the operator rotates the rod to allow the stud 48 to align with the opening 47. Other types of latching means may be provided without deviating from the inventive characteristics of the present invention.

In construction, the retention sleeve is formed of a 3"x 3" square steel tubing. The plate 24 which seals the lower portion of the tubing is formed of a ¼" thick flat piece of steel having a 2¼" diameter opening 24'therethrough. The plate 24 serves as a stop for the generally square base portion 26 of the hitch ball which is of a dimension of approximately 2 ¼" by 2¼". The ball 25 of the h1tch ball under the given circumstances would be a 2 5/16" ball so that the ball will pass through the 2¼" hole provided in the plate 24 when the hitch ball is inserted in inverted relationship as shown in FIG. 5 of the drawings. Generally, the retention sleeve and the base portion of the hitch ball are of a length of approximately 4". The foregoing dimensions are by way of example only and may be varied depending upon the exact size of ball utilized with the hitch ball of the fifth wheel trailer hitch assembly of the present invention.

In use, a generally square opening is made in the load bed of a conventional vehicle which is of a size to permit the retention sleeve to be snuggly engaged therein. Once the opening has been created in the load bed of the vehicle, the reinforcing frame 14 is positioned along the lower surface of the load bed and is bolted, welded or otherwise secured thereto in such a position to insure that the upper edge 19 of the retention sleeve 12 is aligned substantially flush with the surface of the load bed as is shown in FIG. 5.

In order to install the hitch ball 10 within the retention sleeve 12, the handle 46 of the locking rod or pin 41 is pulled outwardly so that the rod is disengaged from the opening 23 in the retention sleeve. Thereafter, the base portion 26 of the hitch ball is inserted within the retention sleeve from the upper surface of the load bed and lowered until the lower portion 30 of the base 26 engages with the support plate 24 which closes the peripheral edges of the retention sleeve. In this position, the openings 29 in the base 26 of the hitch ball will be aligned with the openings 23 in the retention sleeve. Thereafter, the locking rod 41 may be allowed to pass through the aligned openings 23 and 29 through the retention sleeve and base portion of the hitch ball to secure the hitch ball within the retention sleeve. Accidental withdraw of the retention rod will be prevented by the spring element 45 continuously urging the retention rod into its locked position with regard to the retention sleeve and hitch ball.

When the hitch ball has been installed, the ball 25 will be elevated above the load bed so as to be in position to receive a conventional hitch assembly associated with the trailing vehicle.

When desired to store the hitch ball, the locking rod is urged outwardly from its locked position by engaging the handle 46 thereof and pulling the rod outwardly of the openings 23 and 29 through the retention sleeve and base portion 26 of the hitch ball respectively. Utilizing the retention latch 48 associated with the guide element 43, the locking rod may be retained in an unlocked position until the hitch ball is lifted from the retention sleeve and inverted so that the ball 25 thereof is inserted within the retention sleeve. As the ball 25 is inserted, the ball will pass through the opening 24'provided through the plate 24 welded to the bottom portion 20 of the retention sleeve allowing the hitch ball to be seated within the retention sleeve by the engagement of the upper edges 27 thereof with the plate 24.

Thereafter, the locking rod may be rotated to release the latch 48 and the locking rod re-inserted through the openings 23 and 29 provided through the retention sleeve and the hitch ball respectively. The position of the hitch ball when inverted is shown in FIGS. 2 and 5. In this position, the bottom plate 31 of the hitch ball is generally flush with the load bed. When it is necessary to again install the hitch ball, after the locking rod has been released from its engaged position with the openings 23 and 29 of the retention sleeve and hitch ball, an individual may extend their finger through the opening 32 in the plate 31 closing the bottom 30 of the base portion 26 of the hitch ball and thereafter lift the hitch ball from the retention sleeve so that the hitch ball can be re-oriented and aligned for use. As opposed to the opening 32 in the plate 31, a recess and pivotable bail member could be used by appropriately connecting the bail member to the plate.

Again, the alignment of the reinforcing frame 14 may h=varied depending upon the type of vehicle to which the fifth wheel trailer hitch assembly is to be installed however, the frame is generally mounted across the width of the bed or from side-to-side of the vehicle. It is important that the operating handle 46 of the locking rod may be easily grasped by an individual and that the handle should be in a position which is remote from the edges of the vehicle body so that no accidental manipulation of the handle 46 is possible. In FIG. 1, the handle is shown as being accessible from the behind the rear tire of the vehicle and with the driver's side wheel well.

We claim:

1. A fifth wheel trailer hitch assembly for use with vehicles having load beds wherein the load bed is provided with an opening therein comprising a reinforcing frame, said reinforcing frame being mounted to the under side of the vehicle load bed so as to extend outwardly with respect to the opening in the vehicle bed, a retention sleeve mounted to said reinforcing frame, said retention sleeve having upper and lower ends, a first opening in said lower end of said retention sleeve and having a first dimension, a second opening in said upper end of said retention sleeve, generally flush with the load bed, a hitch ball means, said hitch ball means including a ball element and a base portion having an end opposite said ball element, said base portion being selectively receivable within said retention sleeve so that said ball element extends through the second opening in the retention sleeve and upwardly with respect to the load bed of the vehicle, said ball element being of a second dimension which is slightly less than said first dimension of said first opening in said retention sleeve wherein said base portion is generally flush with said load bed, and means for securing said hitch ball means within said retention sleeve.

2. The fifth wheel trailer hitch assembly of claim 1 wherein said base portion of said hitch ball means includes upper and lower ends, a plate means partially closing said lower end of said base portion, a third opening in said plate means for use in lifting said hitch ball assembly from said retention sleeve when said ball element thereof is inserted within said retention sleeve.

3. The fifth wheel trailer hitch assembly of claim 2 including a second plate means for closing said lower end of said base portion of said hitch ball assembly, said first opening being through said second plate means.

4. The fifth wheel trailer hitch assembly of claim 2 in which said retention sleeve includes a first pair of aligned openings therethrough, said base portion of said hitch ball means including a second pair of aligned openings therethrough, said first aligned openings being in alignment with said second aligned openings when said hitch ball means is mounted within said retention sleeve means, and said means for securing said hitch ball means within said retention sleeve means including a locking rod extendable through said first and second aligned openings.

5. The fifth wheel trailer hitch assembly of claim 4 including resilient means mounted adjacent said locking rod for normally urging said locking rod through said first and second aligned openings.

6. The fifth wheel trailer hitch assembly of claim 5 including a latch means carried by said locking rod, and guide means for cooperating with said latch means to retain said locking rod in a position remote from said first and second aligned openings.

7. The fifth wheel trailer hitch assembly of claim 3 in which said retention sleeve has a rectilinear cross section, said base portion of said hitch ball means having a rectilinear cross section, said first opening being generally circular, said upper end of said base portion of said hitch ball means being seated against said second plate means when said hitch ball means is inserted within said retention sleeve with said ball element extending through said first opening.

* * * * *

UNITED STATES PATENT AND TRADEMARK OFFICE
CERTIFICATE OF CORRECTION

PATENT NO. : 5,016,898
DATED : May 21, 1991
INVENTOR(S) : Joseph W. Works and Roger D. Baker It is certified that error appears in the above-identified patent and that said Letters Patent is hereby corrected as shown below:

In the claims, at column 9, lines 10 to 32, claim 1 should read:

1. A fifth wheel trailer hitch assembly for use with vehicles having load beds wherein the load bed is provided with an opening therein comprising a reinforcing frame, said reinforcing frame being mounted to the under side of the vehicle load bed so as to extend out-wardly with respect to the opening in the vehicle bed, a retention sleeve mounted to said reinforcing frame, said retention sleeve having upper and lower ends, a first opening in said lower end of said retention sleeve and having a first dimension, a second opening in said upper end of said retention sleeve, generally flush with the load bed, a hitch ball means, said hitch ball means including a ball element and a base portion having an end opposite said ball element, said base portion being selectively receivable within said retention sleeve so that said ball element extends through the second opening in the retention sleeve and upwardly with respect to the load bed of the vehicle, said ball element being of a second dimension which is slightly less than said first dimension of said first opening in said retention sleeve, said hitch ball being selectively invertable with respect to said retention sleeve so that said ball element passes through said first opening in said retention sleeve wherein said base portion is generally flush with said load bed, and means for securing said hitch ball means within said retention sleeve.

Signed and Sealed this

First Day of June, 1999

*Attest:*

*Attesting Officer*

Q. TODD DICKINSON

*Acting Commissioner of Patents and Trademarks*